No. 779,352. PATENTED JAN. 3, 1905.
J. R. DUPOY.
CONSTANT LEVEL GAS METER.
APPLICATION FILED JULY 20, 1904.

3 SHEETS—SHEET 1.

WITNESSES

INVENTOR
Jean Romain Dupoy
BY
ATTORNEYS

No. 779,352. PATENTED JAN. 3, 1905.
J. R. DUPOY.
CONSTANT LEVEL GAS METER.
APPLICATION FILED JULY 20, 1904.

3 SHEETS—SHEET 2.

WITNESSES

INVENTOR
Jean Romain Dupoy
BY
ATTORNEYS.

No. 779,352. PATENTED JAN. 3, 1905.
J. R. DUPOY.
CONSTANT LEVEL GAS METER.
APPLICATION FILED JULY 20, 1904.

3 SHEETS—SHEET 3.

WITNESSES

INVENTOR
Jean Romain Dupoy.

BY
ATTORNEYS.

UNITED STATES PATENT OFFICE.

UNITED STATES PATENT OFFICE.

JEAN ROMAIN DUPOY, OF PARIS, FRANCE.

CONSTANT-LEVEL GAS-METER.

SPECIFICATION forming part of Letters Patent No. 779,352, dated January 3, 1905.

Application filed July 20, 1904. Serial No. 217,356.

*To all whom it may concern:*

Be it known that I, JEAN ROMAIN DUPOY, engineer, of 36 Rue Guersant, in the city of Paris, Republic of France, have invented a Constant-Level Gas-Meter, of which the following is a full, clear, and exact description.

This invention relates to meters, and is especially useful in the construction of gas-meters.

The object of the invention is to provide simple means for automatically maintaining a constant water-level in the meter.

The invention is illustrated by way of example in the accompanying drawings, wherein—

Figure 1:
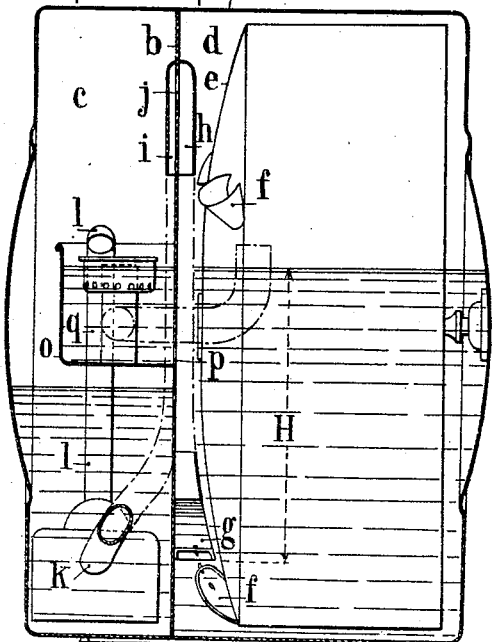
Figure 4:
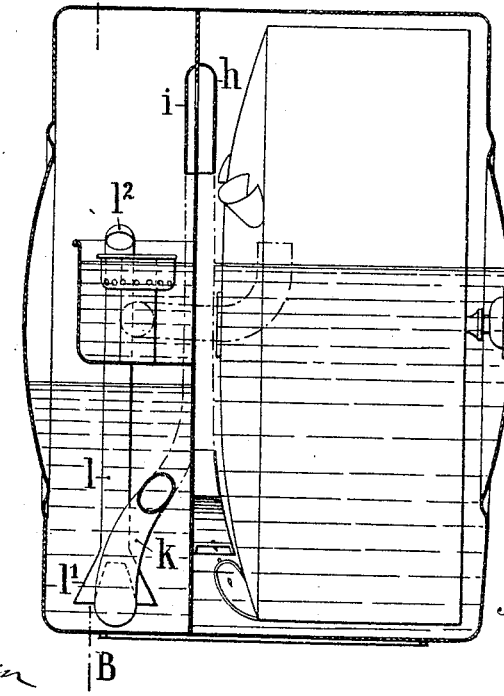
Figure 2:
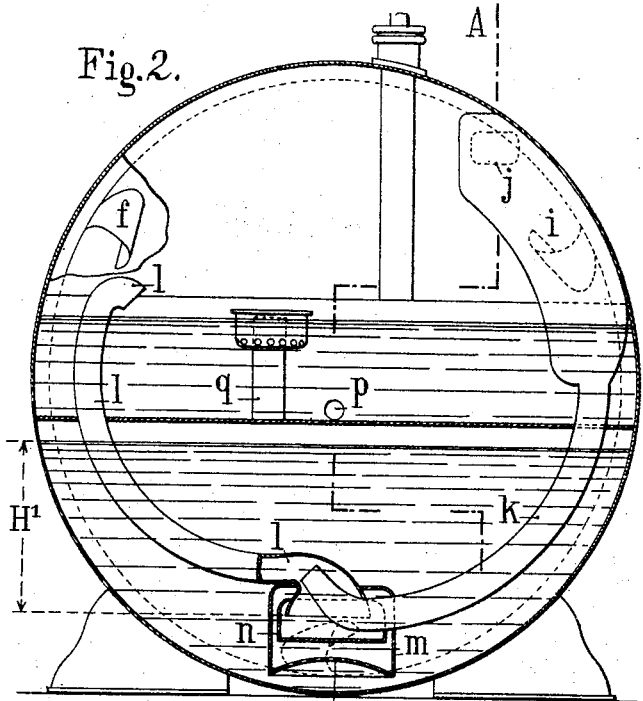
Figure 5:
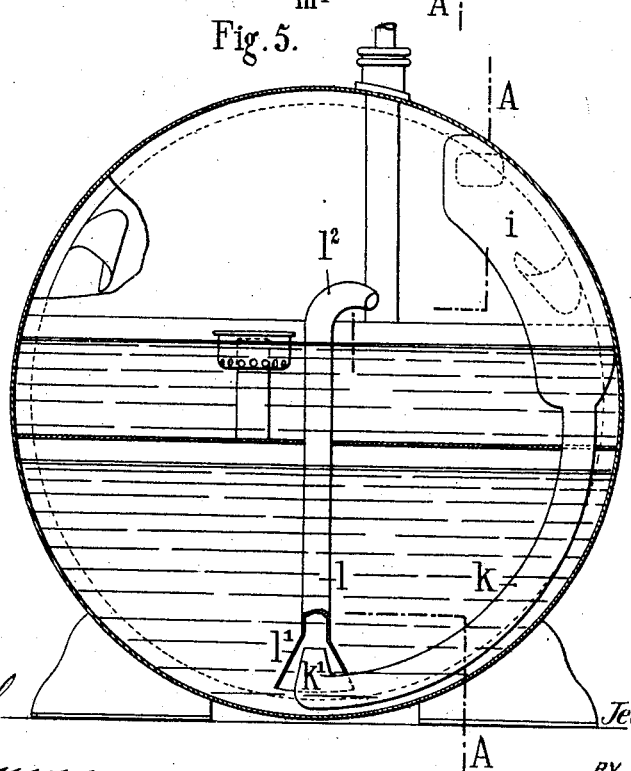
Figure 3:
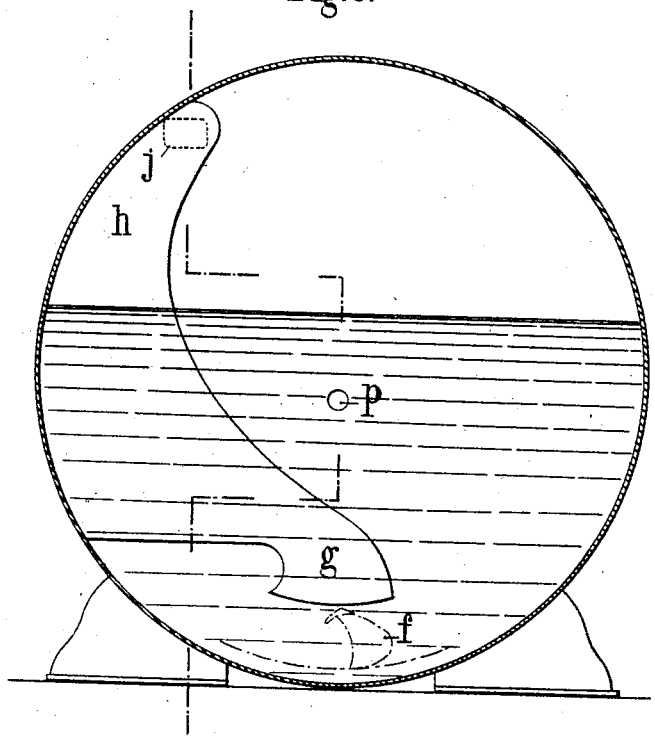

Figure 1 represents a longitudinal section of the apparatus on line A A of Fig. 2. Figs. 2 and 3 are cross-sections taken, respectively, on lines B B and C C of Fig. 1, showing the two faces of the partition separating the hydraulic compartment of the meter from the compartment containing the drum. Figs. 4 and 5 show, respectively, a longitudinal section and a cross-section of a modified form of the invention.

The same letters of reference denote like parts in the several figures.

In the drawings, $a$ represents the cylindrical casing of a meter, divided by a partition $b$ into two compartments $c$ and $d$. The gas is supplied to compartment $c$ in the ordinary manner by means of a valve controlled by a float and passes out through chamber $d$ after being measured by the drum $e$.

Upon the head of drum $e$ are fixed one or more buckets or cups $f$, (three, for example,) arranged, as shown, so as to successively take up a certain quantity of gas at the moment they dip into the liquid and to liberate said gas when they arrive at the lowest point of their course. The bubbles of gas thus liberated are collected in a hood $g$, attached to partition $b$ and communicating, by means of a chamber $h$, with a chamber or passage $i$, arranged upon the opposite face of said partition. An aperture $j$, formed in the partition, permits of free communication between the chambers $h$ and $i$. The chamber $i$ is prolonged at its lower part in the form of a tube $k$, whose extremity is received within the flared end of a tube $l$, which opens into a chamber $m$, provided with a perforated bottom $m'$ for the admission of water contained in the hydraulic compartment of the meter. A cap $n$ is interposed between the wall of chamber $m$ and the mouth of tube $l$ to serve as a hydraulic resistance. The diameter of the tube $l$ should be sufficiently small to insure that the adhesion of the liquid to the inner walls of the tube is sufficient to permit of the bubbles of gas acting as a piston.

The tube $l$ rises at its other extremity above the normal level of the water in the compartment containing the measuring-drum and discharge the water, which is forced in the manner hereinafter described into an auxiliary reservoir $o$, which is in communication with the compartment containing the drum $e$ by means of one or more orifices $p$ in partition $b$. The reservoir $o$ is furnished with an overflow-pipe $q$.

The action of the apparatus is as follows: The cups $f$, which are carried round by the drum $e$, successively take up a certain quantity of gas, which they liberate only when they arrive at the lowest point of their course. The bubbles of gas so liberated are received in the hood $g$ and are thence conducted, by means of the chamber $h$, into the chamber $i$, which is closed on the drum side by a hydraulic seal of a depth H and on the side of the hydraulic compartment by a seal of a depth H'. As the seal H' is less than the seal H, it will be evident that the gas will escape from the extremity of tube $k$ as soon as the pressure in chamber $i$ exceeds that due to the depth H' of the water contained in tube $l$. The gas on escaping from tube $k$ passes up through the tube $l$ rather than through the bottom of the chamber $m$, inasmuch as the cap $n$, in conjunction with the flared extremity of the tube $l$, constitutes a series of baffles which create a hydraulic resistance which is superior to the resistance opposed by the tube $l$. The bubbles of gas in rising through tube $l$ act as a piston and force before them the water contained in said tube, which water is discharged into the reservoir $o$ and thence passes into the drum-compartment. In consequence of the action produced by the escape of the gas from the extremity of the tube $k$ the pressure in chamber $i$ falls, and the water then enters through the perforations $m'$ into chamber $m$ and thence into tube $l$, the upper extremity of which opens freely above the water and into tube $k$. In consequence of the gas being supplied to chamber $i$ by the cups $f$ in a regular manner the pressure rises little by little until it has attained the required degree for permitting the gas to again escape from the end of tube $k$ into tube $l$ and force out a fresh quantity of water, as before described. The same phenomena are thus reproduced successively in bringing about an intermittent delivery of water into the drum-compartment of the meter, the water in excess passing away through the overflow-pipe $q$ and being returned to the reserve in the hydraulic compartment This hydraulic resistance-chamber may in some cases be dispensed with, particularly by giving to the pipe $k$ a sudden change of direction. This arrangement, which is more simple than the one previously described, is represented in Figs. 4 and 5. In this modification the tube $k$, coming after the chamber $i$, dips into the liquid and ends in an ajutage $k'$, the axis of which is vertical. This ajutage ends within the vertical tube $l$, which is terminated at its lower part by a hood $l'$, adapted to facilitate the collecting of the bubbles and at same time to offer a resistance to the passage of the water, and at the upper part by an overflow $l^2$, ending above the normal level of the water in the drum-casing. The bubbles collected as above specified by the buckets arranged on the drum ascend through the tube $h$ and are collected in the chamber $i$. As the volume of gas increases in $i$ the water which has reached a part of the tube $k$ on passing through the ajutage $k'$ is forced back and thrown off the tube $k$. At this moment the pressure of the gas collected in $i$ and $k$ is sufficient to overcome the resistance offered by the ajutage $k'$ and the tube $l$. A part of the collected gas escapes now suddenly through the tube $l$, forcing or driving before it the water contained in this tube, which then flows down through the overflow-pipe $l^2$ into the drum-casing.

The form, dimensions, and arrangement of the several parts constituting the apparatus may be varied according to the nature of each application.

I claim—

1. Apparatus for automatically maintaining a constant level of the water in a gas-meter, consisting essentially in the employment of buckets mounted upon the exterior of the drum for successively taking up a certain quantity of gas at each revolution of the drum, a chamber to which the gas thus taken up is admitted and in which it is accumulated, a reserve water-compartment communicating with said gas-chamber by means of a pipe adapted to act as an injector and debouching beneath the flared mouth of a second tube extending upward above the level of the water in the drum-casing, the arrangement being such that the pressure of the gas stored in the chamber will produce, as soon as its mass and pressure are sufficient to overcome the resistance offered to the water by the walls of the tubes, a mechanical flow into the drum-casing of the water which during the preceding period of accumulation has entered the tubes through the base of the injector, substantially as specified.

2. In a gas-meter, in combination, a rotatable drum, a drum-compartment in which said drum is mounted, a reservoir, and means actuated by said drum for feeding water from said reservoir to said drum-compartment.

3. In a gas-meter, in combination, a drum-compartment containing water, a drum rotatably mounted therein, a reservoir, cups carried by said drum, and means whereby said cups may cause a feeding of water from said reservoir to said drum-compartment.

4. In a gas-meter, in combination, a drum-compartment adapted to contain water, a drum rotatably mounted therein and carrying cups adapted to pass below the surface of the water within said drum-compartment in an inverted position, means for collecting the gas escaping from said cups beneath the water within said drum-compartment, a reservoir, and means for entraining water from said reservoir to feed the same into said drum-compartment.

5. In a gas-meter, in combination, a drum-compartment adapted to contain water, a drum rotatably mounted therein and carrying cups which immerse themselves in an inverted position as the drum rotates, whereby said cups may carry gas under the water within said compartment, a reservoir adapted to contain a water-supply, means for collecting the gas escaping from said cups and delivering the same below the water-line within said reservoir, a tubular member, the interior whereof is in communication with said reservoir, said tubular member receiving the gas delivered from said cups, to entrain water therein, and means for delivering said entrained water into said drum-compartment.

The foregoing specification of my constant-level gas-meter signed by me this 29th day of June, 1904.

JEAN ROMAIN DUPOY.

Witnesses:
  HANSON C. COXE,
  MAURICE H. PIGNET.